United States Patent
Shivashankaraiah (10) Patent No.: US 9,510,184 B2
(45) Date of Patent: Nov. 29, 2016

(54) CONTACT MANAGEMENT AND DIALING USING CONDITIONAL FLOW LOGIC

(71) Applicant: International Business Machines Corporation, Armonk, NY (US)

(72) Inventor: Nataraj Shivashankaraiah, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 78 days.

(21) Appl. No.: 14/554,213

(22) Filed: Nov. 26, 2014

(65) Prior Publication Data

US 2016/0150081 A1    May 26, 2016

(51) Int. Cl.
| | |
|---|---|
| *H04W 8/18* | (2009.01) |
| *H04W 4/14* | (2009.01) |
| *H04M 1/2745* | (2006.01) |
| *H04M 1/725* | (2006.01) |
| *H04M 1/56* | (2006.01) |
| *H04M 3/42* | (2006.01) |
| *H04M 3/44* | (2006.01) |

(52) U.S. Cl.
CPC ....... *H04W 8/183* (2013.01); *H04M 1/274508* (2013.01); *H04M 1/274533* (2013.01); *H04M 1/274575* (2013.01); *H04M 1/72519* (2013.01); *H04M 3/4211* (2013.01); *H04M 3/44* (2013.01); *H04W 4/14* (2013.01); *H04M 1/274583* (2013.01); *H04M 1/56* (2013.01); *H04M 2250/60* (2013.01)

(58) Field of Classification Search
None
See application file for complete search history.

(56) References Cited

U.S. PATENT DOCUMENTS

| | | | |
|---|---|---|---|
| 8,577,007 B2 | 11/2013 | Sherman et al. | |
| 8,594,298 B2 | 11/2013 | Klein et al. | |
| 2008/0075251 A1 | 3/2008 | Jefferson et al. | |
| 2009/0016504 A1* | 1/2009 | Mantell | H04L 12/5835 379/101.01 |
| 2009/0041221 A1 | 2/2009 | Sherman et al. | |
| 2009/0161846 A1 | 6/2009 | Perrin et al. | |
| 2010/0027777 A1* | 2/2010 | Gupta | H04M 3/42195 379/210.01 |

OTHER PUBLICATIONS

U.S. Appl. No. 15/062,953, filed Mar. 7, 2016.
Appendix P (List of IBM Patents or Patent Applications Treated as Related), 2 pages, filed Mar. 7, 2016.
"Predictive Dialing",Registered in England and Wales No. 07935579, Vat No. 8128123341, Copyright © 2014 Easycallnow Limited,<http://www.easycallnow.net/predictive-dialer>.
"Programming the App to Make Decisions: Conditional Blocks", downloaded on Sep. 22, 2014, <http://www.google.co.in/url?sa=t&rct=j&q=&esrc=s&source=web&cd=8&ved=0CGsQFjAH&url=http%3A%2F%Fcs.usfca.edu%2F~wolber%2Fappinventor%2Fconditionals10.25.pdf&ei=-517UuX2AcSMrQeO4IC4Cw&usg=AFQjCNHTPDC1RuvmLAavOn8pfKG4zKn7Vg&sig2=VUj9_GzGTs0c2KuOISE5Pg&bvm=bv.56146854,d.bmk>.

(Continued)

*Primary Examiner* — Olumide T Ajibade Akonai
*Assistant Examiner* — Margaret G Mastrodonato
(74) *Attorney, Agent, or Firm* — Maeve Carpenter (57) ABSTRACT

A tool for contacts management and automated calling. The tool displays, by one or more computer processors, a contact page for adding a contact, wherein the contact page includes at least one conditional flow statement field. The tool program prompts, by one more computer processors, to configure the at least one conditional flow statement field. The tool saves, by one or more computer processors, the contact based on the at least one control flow statement field. The tool initiates, by one or more computer processors, an automated call to the contact based, on the at least one conditional flow statement field. The tool applies, by one or more computer processors, the at least one conditional flow statement field to the automated call to the contact.

20 Claims, 5 Drawing Sheets

(56) References Cited

OTHER PUBLICATIONS

"The Top 5 Ways You Can Use Auto Dialer to Make Your Business Stronger", Mar. 5, 2013, Copyright © 2013 Voice2Phone Software, <http://voice2phone.com/blog/the-top-5-ways-you-can-use-auto-dialer-to-make-your-business-stronger>.

U.S. Appl. No. 15/220,735, filed Jul. 27, 2016.

Appendix P (List of IBM Patents or Patent Applications Treated As Related), 2 pages, filed herewith.

* cited by examiner

CONTACT MANAGEMENT AND DIALING USING CONDITIONAL FLOW LOGIC

BACKGROUND OF THE INVENTION

The present invention relates generally to telecommunications, and more particularly to contact management and automated dialing on a mobile device.

Mobile devices allow users to store multiple numbers under a single contact name. For example, under a contact name "Home", a user can save multiple phone numbers for each family member living at home. When making a phone call to a phone number under the contact name "Home", the user has to scroll up and down through a contacts list, find the contact name "Home", and then scroll up or down to select a desired phone number stored under the contact name. In the case where the user calling the desired phone number receives no answer, the user must again select a second phone number to call stored under the contact name in order to reach someone in their family.

In another example, a user has various meetings which are repetitive on a daily basis at different times with different people, such as a manager, a team leader, and a partner team. In this case, the user would be dialing to the same meeting number allotted by his company, but the pass code to join these various meetings will be different. Therefore, the user has to dial the meeting number and wait for the automated voice that plays an audio message, such as "Please enter your pass code followed by # key now". After listening to the message, the user must enter the pass code for a particular meeting and announce a name.

In yet another example, a person wishes to invite fifty guests to his birthday celebration. The user creates a list of contacts to invite on a sheet of paper, selects each contact from a contact list on a mobile device, and dials each contact one at a time, updating the list on the sheet of paper accordingly.

SUMMARY

Aspects of an embodiment of the present invention disclose a method, system, and computer program product for contacts management and automated calling. The method includes displaying, by one or more computer processors, a contact page for adding a contact, wherein the contact page includes at least one conditional flow statement field. The method includes prompting, by one more computer processors, to configure the at least one conditional flow statement field. In response to configuring the at least one conditional flow statement field, the method includes saving, by one or more computer processors, the contact based on the at least one control flow statement field. The method includes initiating, by one or more computer processors, an automated call to the contact based, on the at least one conditional flow statement field. The method includes applying, by one or more computer processors, the at least one conditional flow statement field to the automated call to the contact.

DETAILED DESCRIPTION

Implementation of such embodiments may take a variety of forms, and exemplary implementation details are discussed subsequently with reference to the Figures.

As will be appreciated by one skilled in the art, aspects of the present invention may be embodied as a method or system. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present invention may take the form of a computer program product embodied in one or more computer-readable media having computer readable program code/instructions embodied thereon.

Figure 1:
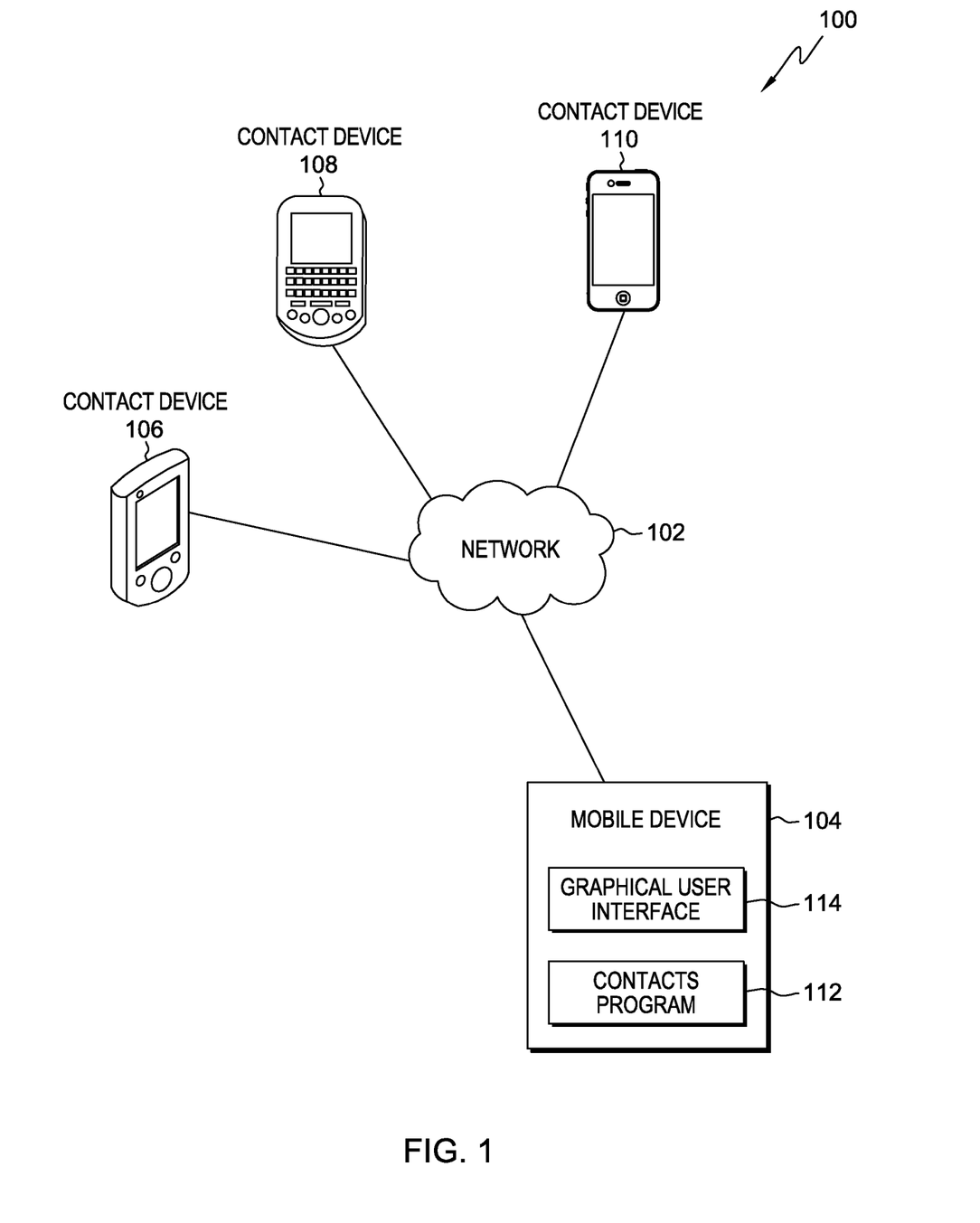
FIG. 1 is a functional block diagram illustrating a data processing environment, generally designated 100, in accordance with an embodiment of the present invention.

The present invention will now be described in detail with reference to the Figures. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims. FIG. 1 illustrates an exemplary data processing environment 100 including a network 102, a mobile device 104, and multiple contact devices, such as contact device 106, contact device 108, and contact device 110.

In the exemplary embodiment, network 102 is the Internet representing a worldwide collection of networks and gateways that use TCP/IP protocols to communicate with one another. Network 102 may include wire cables, wireless communication links, fiber optic cables, routers, switches and/or firewalls. Mobile device 104, contact device 106, contact device 108, and contact device 110 are interconnected by network 102. Network 102 can be any combination of connections and protocols capable of supporting communications between mobile device 104, contact device 106, contact device 108, contact device 110, and contacts program 112. Network 102 may also be implemented as a number of different types of networks, such as an intranet, a local area network (LAN), a virtual local area network (VLAN), or a wide area network (WAN). FIG. 1 is intended as an example and not as an architectural limitation for the different embodiments.

In the exemplary embodiment, mobile device 104 may be, for example, a desktop computer, a laptop computer, a tablet computer, a personal digital assistant (PDA), a smart phone, a thin client, or any other electronic device or computing system capable of storing contacts, conducting a phone call, or accessing the Internet. In one embodiment, mobile device 102 may be any suitable type of mobile device capable of running mobile applications, including a smart phone, tablet, slate, or any type of device that runs a mobile operating system. Mobile device 104 includes a contacts program 112 and a graphical user interface (GUI) 114.

In the exemplary embodiment, contacts program 112 is a software-based program configured within a mobile operating system (OS) of a mobile device, such as mobile device 104, for storing contacts using control flow statement logic and initiating automated dialing of stored contacts using the control flow statement logic. Conditional flow statements include both control statements and logical operators available in most of computer languages. Control statements include decision-making statements (if-then, if-then-else, switch), looping statements (for, while, do-while), and branching statements (break, continue, return) supported by most computer languages (e.g., C, C++, etc.). Logical operators include "&&" (Conditional-AND), "||" (Conditional-OR), "?:" (Ternary i.e., shorthand for if-then-else statement), "==" (Equal to), "!=" (Not equal to), ">" (Greater than), and "<" (Less than), etc. In the exemplary embodiment, contacts program 112 provides configurable fields on a graphical user interface on a mobile device, such as a graphical user interface (GUI) 114 on mobile device 104, to store phone contacts using conditional flow statements and initiate automated dialing to a single contact or a group of contacts based, at least in part, on a configured conditional flow logic evaluation.

In some embodiments, contacts program 112 is configurable to generate a configured SMS notification to a contact, based, at least in part, on the control flow statement logic associated with the contact, and provides for automated sending of the configured SMS based, at least in part, on conditional flow logic evaluation. In yet another embodiment, contacts program 112 is configurable to provide an option of remembering which stored contacts have been contacted during an automated calling process, such that when the automated calling process is paused, contacts program 112 can resume the automated calling process from a place when it was paused. In some embodiments, contacts program 112 may provide automated voice notification to the caller announcing the contact name to whom the call is about to be made. In some other embodiments, contacts program 112 provides a pause control to pause the iteration of conditional flow loop and then to resume it again later. In yet another embodiment, contacts program 112 provides for automated entry of a pass code to attend group calls, such as attending a meeting or a conference call, as well as an automated announcement of a user's name while attending the meeting call.

In one embodiment, contacts program 112 provides color-coding technology on a recipient's mobile device, where the color-coding is set to indicate whether a phone call from a caller was answered by any of a plurality of contact names under a group contact. For example, a Joe receives a missed call from a contact "Dad" that appears in a green color on his mobile device. Although the call was missed by Joe, the green color indicates that this call was answered by his sister, Mary, or by his mother, Jennifer, all of whom are members of the group contact "Home". The technology of the present invention can be implemented at a telecommunication provider end where it determines the call was made to a contact group with a conditional flow statement enabled, and in case no automated SMS was sent from the calling number, then the missed call entry on the receiver handset will be made to a green-colored entry.

In an alternative embodiment, contacts program 112 may be a software-based program, downloaded from a central server (not shown) and installed on a mobile device, such as mobile device 104. In yet another embodiment, contacts program 112 may be utilized as a software service provided by a third-party service provider (not shown).

In the exemplary embodiment, GUI 114 is a conventional graphical user interface for displaying stored contacts, options for storing contacts, options for managing stored contacts, and control flow statement logic fields.

In the exemplary embodiment, contact device 106, contact device 108, and contact device 110 are contacts of mobile device 102 and may be, for example, a desktop computer, a laptop computer, a tablet computer, a personal digital assistant (PDA), a smart phone, a thin client, or any other electronic device or computing system capable of communicating with mobile device 104 through network 102. For example, contact device 106, contact device 108, and contact device 110 may be a mobile device capable of connecting to a network, such as network 102, to conduct a phone call or access the Internet.

In an alternate embodiment, mobile device 104, contact device 106, contact device 108, and contact device 110 may be any wearable electronic device, including wearable electronic devices affixed to eyeglasses and sunglasses, helmets, wristwatches, clothing, wigs, and the like, capable of sending, receiving, and processing data. For example, mobile device 104, contact device 106, contact device 108, and contact device 110 may be a wearable electronic device, such as a wristwatch, capable of executing an application and initiating a conversation with another electronic device capable of sending and receiving data, such as mobile device 104 wherein a conversation can include, without limitation, a phone conversation, a video conversation, or any other suitable means of communication.

Figure 2:
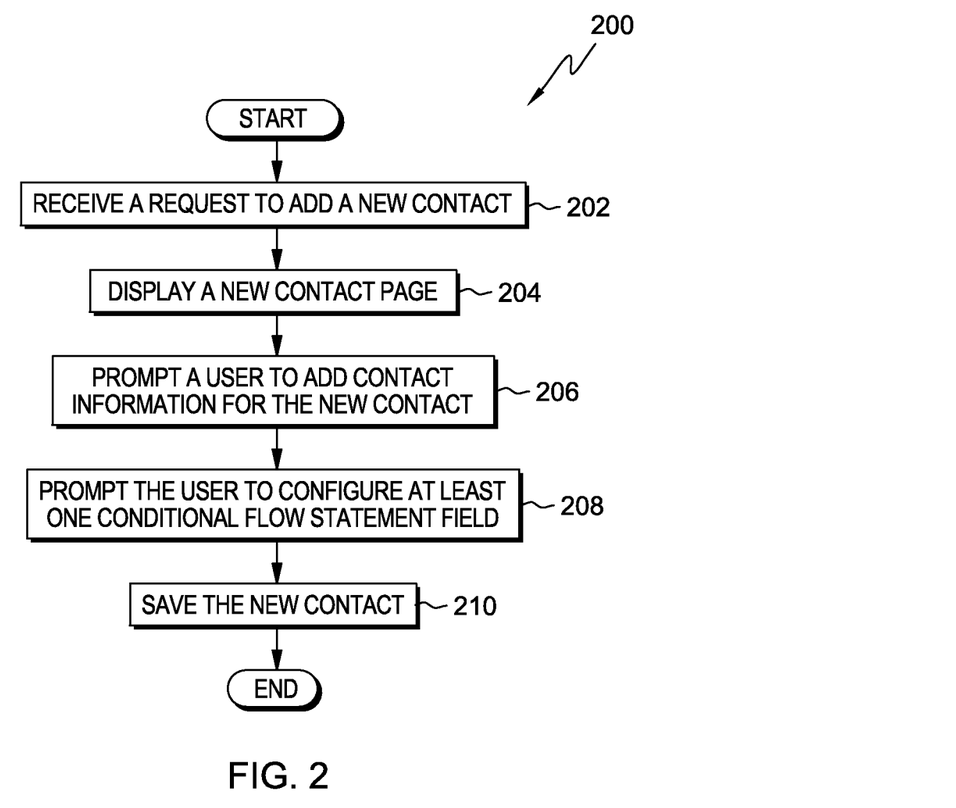
FIG. 2 depicts a flowchart of an exemplary process flow, generally designated 200, for storing and automated dialing of contacts using control flow statement logic, in accordance with an embodiment of the present invention.

FIG. 2 depicts a flowchart of an exemplary process flow, generally designated 200, for storing and automated dialing of contacts using control flow statement logic, in accordance with an embodiment of the present invention.

Contacts program 112 receives a request to add a new contact (202). In the exemplary embodiment, contacts program 112 receives a request to add a contact to an existing list of contacts on a mobile device, such as mobile device 104, when a user opens a contact list on the mobile device and elects to create a new contact or add a contact or contact information to an existing contact. For example, contacts program 112 may receive a request to add a contact when a user selects an "add a contact" feature on a mobile device.

In response to receiving a request to add a new contact, contacts program 112 displays a new contact page to a user (204). In the exemplary embodiment, contacts program 112 displays a contact page, using a graphical user interface, such as GUI 114, wherein displaying the contact page includes providing at least one conditional flow statement field. In the exemplary embodiment, the contact page includes at least one field for entering contact information, configuring control flow statement logic, configuring automated contacting utilizing control flow statement logic, and configuring automated short message service (SMS) text messaging utilizing control flow statement logic. For example, on a mobile device, such as mobile device 104, contacts program 112 may display a new contact page on GUI 114 including a field for entering a contact group name, such as "Home", a control flow statement logic "IF" checkbox with at least one field for entering a contact name and number, a control flow statement logic "FOR" checkbox with a field for entering a value for configuring a number of loop repeats, and a control flow statement logic automated SMS test messaging option.

In response to displaying the new contact page, contacts program 112 prompts the user to add contact information for the new contact (206). In the exemplary embodiment, contacts program 112 prompts the user to add contact information for the contact, wherein contact information includes at least a contact name (e.g., a group name, an individual name, etc.) and a contact number, such as a telephone number, for the new contact. In one embodiment, contacts program 112 prompts the user to add contact information for multiple contacts added under a new contact group. For example, when in response to contacts program 112 prompting the user to add contact information for the new contact the user adds a new contact group name, such as "Home", "Birthday", or "Friends", contacts program 112 prompts the user to add at least one additional contact under the new contact group name, and add contact information for each of the additional contacts. In one embodiment, contacts program 112 may prompt the user to add contact information by highlighting a new contact name field, designating it as a required field.

Contacts program 112 prompts the user to configure the at least one conditional flow statement field (208). In the exemplary embodiment, contacts program 112 prompts the user to configure the at least one conditional flow statement fields, including, without limitation, an "IF", a "FOR", an "ELSE-IF", and an "Automated SMS" conditional flow statement field, by requiring the user to elect to enable or disable a conditional flow statement field, wherein enabling or disabling the conditional flow statement field can be done by selecting or deselecting a checkbox within the contact page. In one embodiment, where the user enables the at least one conditional flow statement field, such as "IF", "FOR", "ELSE IF", etc., contacts program 112 may prompt the user to add at least two or more additional contacts, provide a value for configuring how many times an automated call loop repeats, and provide a custom SMS message to be automatically sent if a condition is met (e.g., contact did not answer call). In an embodiment where an "IF" conditional flow statement field is enabled, contacts program 112 prompts the user to add at least two or more additional contacts, such as a first, second, third, and fourth contact that function as "ELSE-IF" conditions (i.e., where a first contact does not answer, the phone is switched off, the phone is busy, or otherwise not reachable, contacts program 112 advances through the contacts sequentially, calling the second contact, the third contact, etc.). In the embodiment, where adding the additional contacts, contacts program 112 prompts the user to add additional contact information, such as a name and at least one contact number, for each of the additional contacts. In an embodiment where a "FOR" conditional flow statement field is enabled, contacts program 112 prompts the user to specify a value, such as 1 or 2, for how many times an automated call loop (i.e., a call to each of the contacts listed under a contact group) repeats in an attempt to reach each of the contacts. In yet another embodiment, where an "Automated SMS" conditional flow statement field is enabled, contacts program 112 prompts the user to specify a text message, which contacts program 112 sends automatically upon completion of a call loop configured by enabling a "FOR" conditional flow statement field.

In an example, a group contact "Home" has three contact names, such as George, Mary, and Jennifer, with each contact having a different contact number. Where contacts program 112 enables an "IF" conditional statement based on a user configuration, contacts program 112 adds an "ELSE-IF" conditional statement for each contact under the group contact following a first contact. Contacts program 112 may enable an additional conditional flow statement "FOR" having a value equal to two, indicates that calling the IF-ELSE-IF loop repeats for two iterations. Finally, contacts program 112 may enable an automated SMS field with a message containing the text, "Please call me back", indicating that after iterating the call loop twice, and in response to none of the contacts having answered the call, then contacts program 112 sends an automated SMS to all contact members under the group contact.

In response to completing configuration, contacts program 112 saves the new contact (210). In the exemplary embodiment, contacts program 112 saves the contact page within an existing contacts list on a mobile device, such as mobile device 104, wherein saving the contact page includes programming each of the configured conditional flow statement fields on the phones operating system in such a way that the mobile device understands that each of the configured conditional flow statement fields apply to the contact page when dialed. In another embodiment, contacts program 112 saves the contact page to a contacts list provided within contacts program 112, wherein each of the configured conditional flow statement fields are pre-programmed into contacts program 112.

Figure 3:
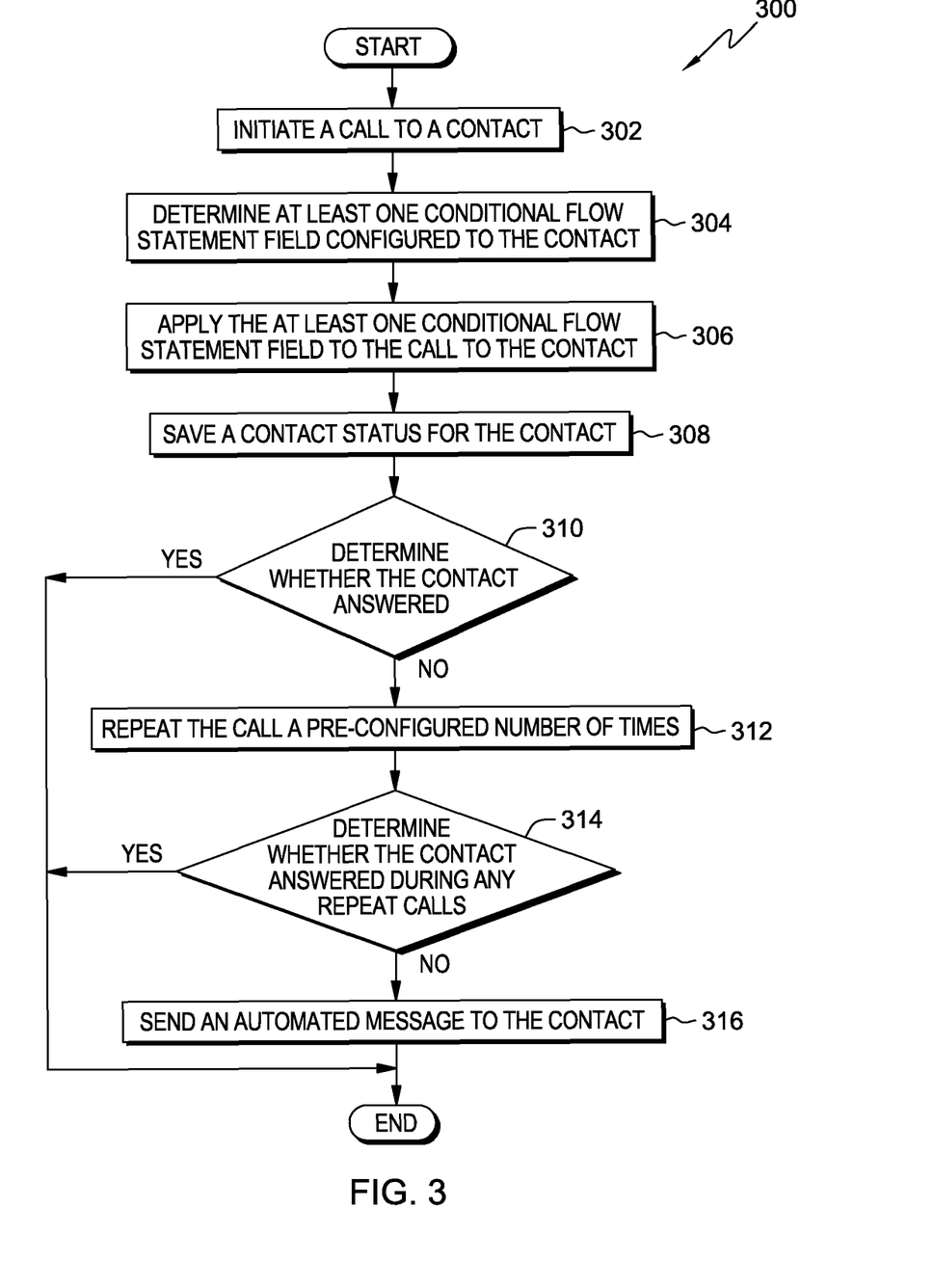
FIG. 3 depicts a flowchart of an exemplary process flow, generally designated 300, of a dialing scenario utilizing at least one conditional flow statement, in accordance with an embodiment of the present invention.

FIG. 3 depicts a flowchart of an exemplary process flow, generally designated 300, of a dialing scenario utilizing at least one conditional flow statement, in accordance with an embodiment of the present invention.

In response to receiving a request to call a contact, contacts program 112 initiates an automated call to a first number for the contact (302). In the exemplary embodiment, contacts program 112 initiates a call to a first number for the contact when a user attempts to dial the contact by selecting the contact from a contacts list on a mobile device, such as mobile device 104. Contacts program 112 initiates the automated call to the first number listed for the contact by dialing the first contact number for the contact in an attempt to reach the contact on, for example, contact device 106, 108, and 110. In one embodiment, the contact can be an individual contact with one or more contact numbers associated with the contact. In another embodiment, the contact can be a group of two or more contacts, with each contact having one or more contact numbers associated with each contact.

Contacts program 112 determines at least one conditional flow statement field configured to the contact (304). In the exemplary embodiment, contacts program 112 determines at least one conditional flow statement field configured to the contact by referencing a saved contact page for the contact to determine the at least one conditional flow statement field enabled for the contact.

Contacts program 112 applies the at least one conditional flow statement field to the automated call to the contact (306). In the exemplary embodiment, contacts program 112 applies the at least one conditional flow statement field to the automated call by proceeding to call the contact based, at least in part, on the at least one conditional flow statement field. For example, where the contact is a group contact, such as "Home", including four contacts, such as a first contact, a second contact, a third contact, and so on, contacts program 112 may apply an enabled "IF" conditional flow statement field to a call to the group contact such that where the first contact does not answer, automatically calling the second contact, and where the second contact does not answer, automatically calling the third contact, and so on. In another example, where the contact is an individual contact having multiple contact numbers listed in a contact page, such as a work telephone number, a home telephone number, and a mobile phone number, contacts program 112 may apply an enabled "IF" conditional flow statement field to a call to the contact such that where the contact does not answer at a first contact number, automatically calling the second contact number, and where the contact does not answer the second contact number, automatically calling the third contact number, and so on. In another example, in the case of a reserved contact group "Birthday" having a contact list with entries GUEST1, GUEST2, GUEST3, and so on. GUEST1, GUEST2, and GUEST3 contacts will be treated as sub-group contact that may have an individual contact number or multiple contact numbers associated with a group. Within the group, "IF-ELSE-IF" conditional flow statement logic will be used internally, and a conditional flow statement ELSE-IF will be enabled for each remaining contact in the group after a first contact. Where the first contact number, such as GUEST1, does not respond to a user's call, then contacts program 112 automatically dials to the next available number under this group. A pause button may be provided while initiating a call to the group, wherein pressing the pause button suspends further calls to the group, and calling can be resumed at a later time by pressing a resume button. A "FOR" conditional flow statement field may be available for the user to configure a number value, the number value indicating a number of times to repeat a call loop. During each call loop, contacts program 112 may mark one or more contacts who answered the call as invited, and manage two lists, an invited list and a not invited list. Contacts program 112 may move an invited contact to the invited list, and a no response contact to the not invited list. After completion of traversing through all loop iterations, contacts program 112 may send out an automated SMS, such as "I have my birthday party at my home, please join this celebration" to each contact included in the not invited list. After sending the automated SMS, contacts program 112 may erase all information related to this iteration of call made to the group.

Contacts program 112 saves a contact status for the contact (308). In the exemplary embodiment, contacts program 112 saves a contact status for the contact, wherein the contact status indicates whether the contact has been contacted (i.e., the contact answered the call, the contact returned the call during automated calling, etc.) or the contact has not been contacted (i.e., the contact did not answer the call, the contact was unreachable, the call went to voicemail, etc.). For example, contacts program 112 may mark a contact as "Contacted" to indicate that the contact was successfully reached, or mark a contact as "Not Contacted" to indicate that the contact was unsuccessfully reached. In one embodiment, contacts program 112 may mark one or more contacts listed in a group of contacts to save which contacts were reached (i.e., a caller spoke with one or more contacts), and which were not (i.e., a caller was prompted to leave a message), so that during a repeat of the call loop, previously reached contacts are not called again. In yet another embodiment, contacts program 112 may mark one or more contact numbers for an individual contact, such that if the contact was reached on one of the contact numbers, automated contacting for the contact ends. In yet another embodiment, contacts program 112 may mark one or more sub-groups of contacts within a contact group, such that where an individual contact within a sub-group is reached, contacts program 112 marks the entire sub-group as contacted (i.e., relying on an inference that if one member of a family is reached, the entire family has been reached, as any message would be conveyed to the rest of the family through the contacted member).

Contacts program 112 determines whether the contact answered (310). In the exemplary embodiment, contacts program 112 determines whether the contact answered by determining the call was connected. If contacts program 112 determines a connection is established between a user's mobile device, such as mobile device 104, and the contact's device, such as contact device 106, 108, and 110, then contacts program 112 determines the contact answered the call and automated contacting for the contact ends (YES branch, 310). If contacts program 112 determines a connection is not established between a user's mobile device, such as mobile device 104, and the contact's device, such as contact device 106, 108, and 110, then contacts program 112 determines the contact has not answered (e.g., not reachable, busy, no answer, voicemail, etc.) (NO branch, 310).

In response to determining the contact has not answered (NO branch, 310), contacts program 112 repeats the call a pre-configured number of times (312). In the exemplary embodiment, contacts program 112 repeats a call loop for the contact based, at least in part, on conditional flow statement fields configured to the contact page. In one embodiment, where an enabled "FOR" conditional flow statement field indicates a value of "2", contacts program 112 repeats the call loop (e.g., calling each number listed for each contact) two more times, based, at least in part, on the enabled "IF" conditional flow statement field, or until the contact is reached.

Contacts program 112 determines whether the contact answered during any repeat calls (314). In the exemplary embodiment, contacts program 112 determines whether the contact answered during any repeat calls by determining the call was connected. If contacts program 112 determines a connection is established between a user's mobile device, such as mobile device 104, and the contact's device, such as contact devices 106, 108, and 110, then contacts program 112 determines the contact answered the call and automated contacting for the contact ends (YES branch, 314). If contacts program 112 determines a connection is not established between a user's mobile device, such as mobile device 104, and the contact's device, such as contact device 106, 108, and 110 then contacts program 112 determines the contact has not answered (e.g., not reachable, busy, no answer, voicemail, etc.) (NO branch, 314).

In response to determining the contact has not answered during any repeat calls (NO branch 314), contacts program 112 sends an automated message to the contact (316). In the exemplary embodiment, contacts program 112 references an enabled "Automated SMS" conditional flow statement field configured to the contact page and sends the pre-configured text message to any contacts and contact numbers saved with a contact status indicating the contact was not reached. For example, in the case where a "FOR" conditional flow statement field is enabled, after contacts program 112 loops through dialing iterations for a pre-configured number of times, contacts program 112 automatically sends a text message, such as "I am trying to contact you", or "You miss 100% of the shots you don't take, call me back".

Figure 4:
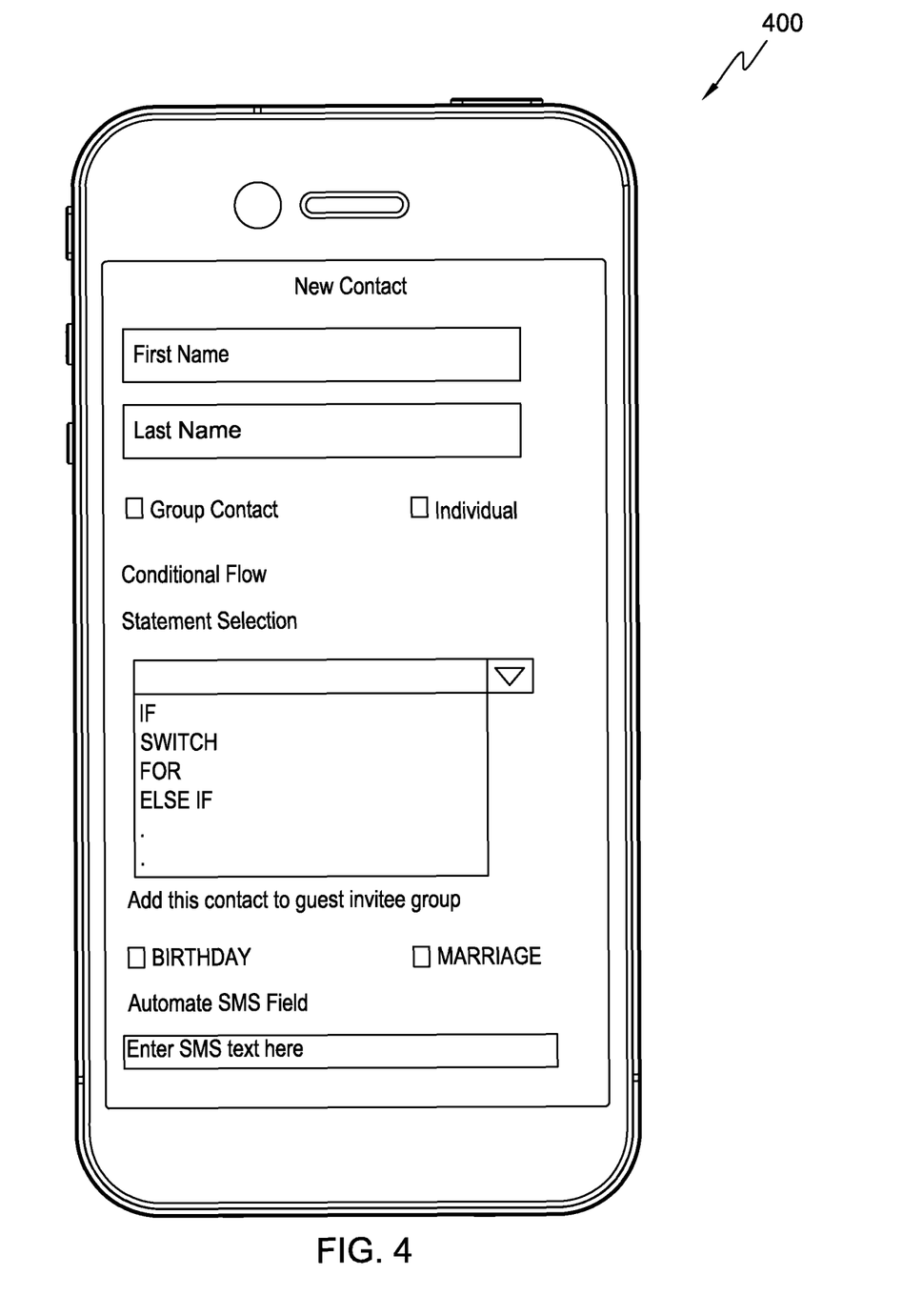
FIG. 4 depicts a screenshot of a new contact page on a mobile device (such as the mobile device of FIG. 1), in accordance with an embodiment of the present invention.

FIG. 4 depicts a screenshot of a new contact page, generally designated 400, on a mobile device display, such as on mobile device 104, in accordance with an embodiment of the present invention. New contact page 400 includes one or more fields to add new contact information, such as a first name and a last name. New contact page 400 includes an option to define a contact as an individual contact or as a group contact, whereas in the later case, new contact page 400 contains one or more additional fields for multiple sub-contact names with numbers associated with those sub-contact names. New contact page 400 includes a conditional flow statement selection field for selecting a conditional flow statement, including, without limitation, "IF," "FOR," "SWITCH," and so on from a drop-down list. Based on a conditional flow statement selection, contacts program 112 provides a user with one or more additional pop-up fields related to the selected conditional flow statement. For example, when a SWITCH conditional statement is selected, contacts program 112 provides a "NAME TO BE ANNOUNCED WHILE JOINING THE MEETING" field for a user to further configure. New contact page 400 includes an option to add a contact to a reserved group, such as "BIRTHDAY" and "MARRIAGE". A reserved group name, such as birthday and marriage, for example, are internally programmed in such a way that when a user dials to the birthday group, contacts program 112 internally handles calling to each contact number listed under the birthday group with internally enabled conditional flow statements.

Figure 5:
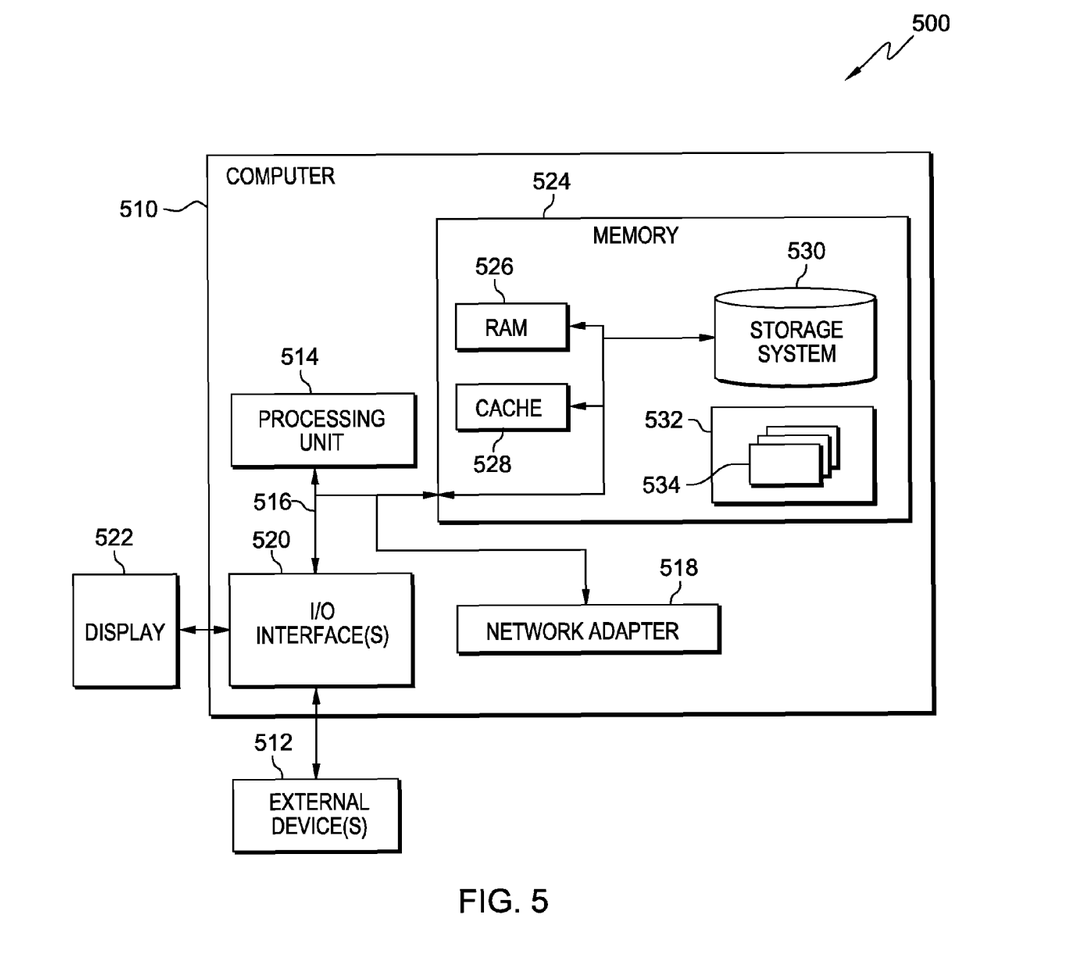
FIG. 5 depicts a block diagram depicting components of a data processing system (such as the mobile device of FIG. 1), generally designated 500, in accordance with an embodiment of the present invention.

FIG. 5 depicts a block diagram of components of a data processing system (such as mobile device 104), generally designated 500, in accordance with an illustrative embodiment of the present invention. It should be appreciated that FIG. 5 provides only an illustration of one implementation and does not imply any limitations with regard to the environments in that different embodiments may be implemented. Many modifications to the depicted environment may be made.

In the illustrative embodiment, mobile device 104 in data processing environment 100 is shown in the form of a general-purpose computing device. The components of computer system 510 may include, but are not limited to, one or more processors or processing unit 514, memory 524, and bus 516 that couples various system components including memory 524 to processing unit 514.

Bus 516 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 510 typically includes a variety of computer system readable media. Such media may be any available media that is accessible by computer system 510, and it includes both volatile and non-volatile media, removable and non-removable media.

Memory 524 can include computer system readable media in the form of volatile memory, such as random access memory (RAM) 526 and/or cache memory 528. Computer system 510 may further include other removable/non-removable, volatile/non-volatile computer system storage media. By way of example only, storage system 530 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 516 by one or more data media interfaces. As will be further depicted and described below, memory 524 may include at least one computer program product having a set (e.g., at least one) of program modules that are configured to carry out the functions of embodiments of the invention.

Program/utility 532, having one or more sets of program modules 534, may be stored in memory 524 by way of example, and not limitation, as well as an operating system, one or more application programs, other program modules, and program data. Each of the operating systems, one or more application programs, other program modules, and program data, or some combination thereof, may include an implementation of a networking environment. Program modules 534 generally carry out the functions and/or methodologies of embodiments of the invention as described herein. Computer system 510 may also communicate with one or more external device(s) 512 such as a keyboard, a pointing device, a display 522, etc., or one or more devices that enable a user to interact with computer system 510 and any devices (e.g., network card, modem, etc.) that enable computer system 510 to communicate with one or more other computing devices. Such communication can occur via Input/Output (I/O) interface(s) 520. Still yet, computer system 510 can communicate with one or more networks such as a local area network (LAN), a general wide area network (WAN), and/or a public network (e.g., the Internet) via network adapter 518. As depicted, network adapter 518 communicates with the other components of computer system 510 via bus 516. It should be understood that although not shown, other hardware and software components, such as microcode, device drivers, redundant processing units, external disk drive arrays, RAID systems, tape drives, and data archival storage systems may be used in conjunction with computer system 510.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The terminology used herein is for the purpose of describing particular embodiments only and is not intended to be limiting of the invention. It should be appreciated that any particular nomenclature herein is used merely for convenience and thus, the invention should not be limited to use solely in any specific function identified and/or implied by such nomenclature. Furthermore, as used herein, the singular forms of "a", "an", and "the" are intended to include the plural forms as well, unless the context clearly indicates otherwise.

What is claimed is:

1. A method for contacts management and automated calling, the method comprising:
   displaying, by one or more computer processors, a contact page for adding a contact, wherein the contact page includes at least one conditional flow statement field;
   prompting, by one more computer processors, to configure the at least one conditional flow statement field, wherein the at least one conditional flow statement field includes at least one control statement and at least one logical operator, the at least one control statement includes a decision-making statement, a looping statement, and a branching statement, and the at least one logical operator includes a symbol representing conditional flow logic;
   in response to configuring the at least one conditional flow statement field, saving, by one or more computer processors, the contact page based on the at least one control flow statement field;

initiating, by one or more computer processors, an automated call to the contact based, on the at least one conditional flow statement field; and applying, by one or more computer processors, the at least one conditional flow statement field to the automated call to the contact.

2. The method of claim 1, wherein displaying the contact page, further comprises providing, by one or more computer processors, at least one of:

a field for entering contact information;

a field for configuring conditional flow statement logic;

a field for configuring automated contacting utilizing conditional flow statement logic; and a field for configuring automated short message service (SMS) text messaging utilizing conditional flow statement logic.

3. The method of claim 1, wherein initiating a call to the contact, further comprises determining, by one or more computer processors, the at least one conditional flow statement field configured to the contact by referencing a saved contact page for the contact.

4. The method of claim 1 further comprises saving, by one or more computer processors, a contact status for the contact, wherein the contact status indicates whether the contact has been contacted.

5. The method of claim 4, wherein saving a contact status for the new contact, further comprises:

responsive to the contact answering the call, determining, by one or more computer processors, the contact answered the call; and responsive to the contact not answering the call, determining, by one or more computer processors, the contact did not answer the call.

6. The method of claim 5, wherein determining the contact did not answer the call, further comprises repeating, by one or more computer processors, a call loop a pre-configured number of times, based, at least in part, on the at least one conditional flow statement.

7. The method for claim 6 further comprises determining, by one or more computer processors, whether the contact answered during any repeat calls during the call loop.

8. The method of claim 7, wherein determining whether the contact answered during any repeat calls, further comprises responsive to determining the contact did not answer during any repeat calls, sending, by one or more computer processors, an automated service message to the contact, based, at least in part, on the at least one conditional flow statement.

9. A computer program product for contacts management and automated calling, the computer program product comprising:

one or more computer readable storage devices and program instructions stored on the one or more computer readable storage devices, the program instructions comprising:

program instructions display, by one or more computer processors, a contact page for adding a contact, wherein the contact page includes at least one conditional flow statement field;

program instructions to prompt, by one more computer processors, to configure the at least one conditional flow statement field, wherein the at least one conditional flow statement field includes at least one control statement and at least one logical operator, the at least one control statement includes a decision-making statement, a looping statement, and a branching statement, and the at least one logical operator includes a symbol representing conditional flow logic;

in response to configuring the at least one conditional flow statement field, program instructions to save, by one or more computer processors, the contact based on the at least one control flow statement field;

program instructions to initiate, by one or more computer processors, an automated call to the contact based, on the at least one conditional flow statement field; and program instructions to apply, by one or more computer processors, the at least one conditional flow statement field to the automated call to the contact.

10. The computer program product of claim 9, wherein program instructions to display a contact page, further comprises program instructions to provide, by one or more computer processors, at least one of:

a field for entering contact information;

a field for configuring conditional flow statement logic;

a field for configuring automated contacting utilizing conditional flow statement logic; and a field for configuring automated short message service (SMS) text messaging utilizing conditional flow statement logic.

11. The computer program product of claim 9, wherein program instructions to initiate a call to the contact, further comprises program instructions to determine, by one or more computer processors, the at least one conditional flow statement field configured to the contact by referencing a saved contact page for the contact.

12. The computer program product of claim 9 further comprises program instructions to save, by one or more computer processors, a contact status for the contact, wherein the contact status indicates whether the contact has been contacted.

13. The computer program product of claim 12, wherein program instructions to save a contact status for the new contact, further comprises:

responsive to the contact answering the call, program instructions to determine, by one or more computer processors, the contact answered the call; and responsive to the contact not answering the call, program instructions to determine, by one or more computer processors, the contact did not answer the call.

14. The computer program product of claim 13, wherein program instructions to determine the contact did not answer the call, further comprises program instructions to repeat, by one or more computer processors, a call loop a pre-configured number of times, based, at least in part, on the at least one conditional flow statement.

15. The computer program product of claim 14 further comprises program instructions to determine, by one or more computer processors, whether the contact answered during any repeat calls during the call loop.

16. The computer program product of claim 15, wherein program instructions to determine whether the contact answered during any repeat calls, further comprises responsive to determining the contact did not answer during any repeat calls, program instructions to send, by one or more computer processors, an automated service message to the contact, based, at least in part, on the at least one conditional flow statement.

17. A computer system for contacts management and automated calling, the computer system comprising:

one or more computer readable storage devices;

program instructions stored on at least one of the one or more computer readable storage devices for execution by at least one of the one or more computer processors, the program instructions comprising:

program instructions display, by one or more computer processors, a contact page for adding a contact, wherein the contact page includes at least one conditional flow statement field;

program instructions to prompt, by one more computer processors, to configure the at least one conditional flow statement field, wherein the at least one conditional flow statement field includes at least one control statement and at least one logical operator, the at least one control statement includes a decision-making statement, a looping statement, and a branching statement, and the at least one logical operator includes a symbol representing conditional flow logic;

in response to configuring the at least one conditional flow statement field, program instructions to save, by one or more computer processors, the contact based on the at least one control flow statement field;

program instructions to initiate, by one or more computer processors, an automated call to the contact based, on the at least one conditional flow statement field; and program instructions to apply, by one or more computer processors, the at least one conditional flow statement field to the automated call to the contact.

18. The computer system of claim 17, wherein program instructions to display a contact page, further comprises program instructions to provide, by one or more computer processors, at least one of:
- a field for entering contact information;
- a field for configuring conditional flow statement logic;
- a field for configuring automated contacting utilizing conditional flow statement logic; and
- a field for configuring automated short message service (SMS) text messaging utilizing conditional flow statement logic.

19. The computer system of claim 17, wherein program instructions to initiate a call to the contact, further comprises program instructions to determine, by one or more computer processors, the at least one conditional flow statement field configured to the contact by referencing a saved contact page for the contact.

20. The computer system of claim 17 further comprises program instructions to save, by one or more computer processors, a contact status for the contact, wherein the contact status indicates whether the contact has been contacted.

* * * * *